Patented June 25, 1935

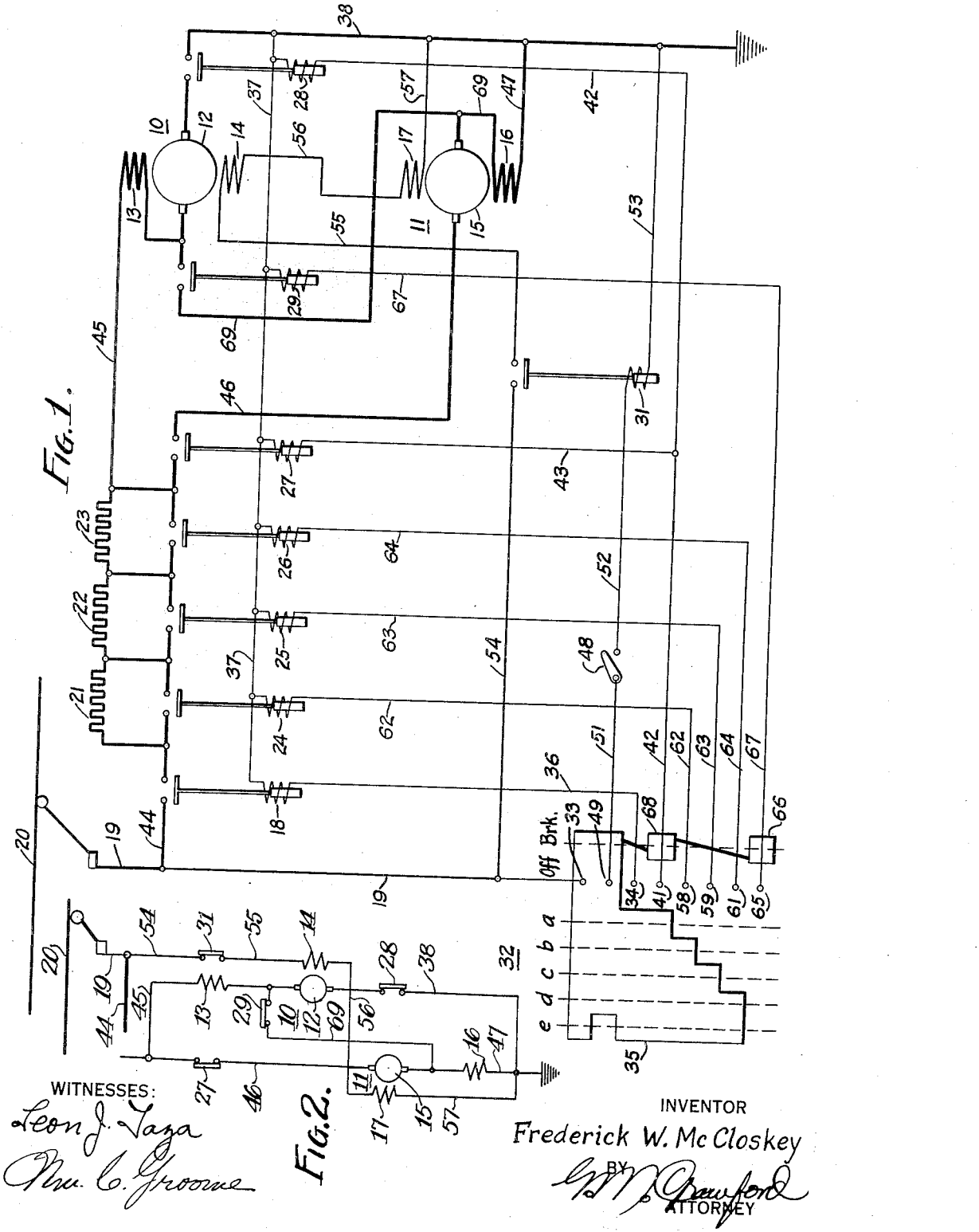

2,005,903

UNITED STATES PATENT OFFICE 2,005,903

MOTOR CONTROL SYSTEM

Frederick W. McCloskey, Wilkinsburg, Pa., assignor to Westinghouse Electric & Manufacturing Company, East Pittsburgh, Pa., a corporation of Pennsylvania Application July 26, 1933, Serial No. 682,226

6 Claims. (Cl. 172—179)

My invention relates, generally, to motor control systems, and, more particularly, to systems for controlling motors which may be utilized both for propelling vehicles, or other equipment, and for stopping the vehicles by dynamic braking.

Series motors have been widely used for propelling street cars and other vehicles and have proven very satisfactory for this type of service. However, considerable difficulty has been experienced in attempting to utilize series motors for dynamic braking, because of the slowness with which the machines start generating when the dynamic braking connections are established, thereby delaying the braking action.

An object of my invention, generally stated, is to provide a motor control system which shall be simple and efficient in operation and which may be readily and economically manufactured and installed.

A more specific object of my invention is to provide a dynamic braking system in which the dynamo-electric machines shall respond quickly to the establishment of dynamic braking connections, thereby quickly producing a dynamic braking effect.

Another object of my invention is to provide for increasing the accelerating torque and the maximum speed of an electric motor.

Other objects of my invention will be described fully hereinafter, or will be apparent to those skilled in the art.

In accordance with one embodiment of my invention, the motors which are utilized for propelling an electric vehicle are each provided with a series field winding and a shunt field winding that is separately excited from the line. The shunt field windings are energized during the acceleration of the vehicle, but are deenergized after the accelerating resistors have been shunted from the motor circuit, thereby increasing the accelerating torque by increasing the field strength during starting, and also increasing the maximum speed of the motors by decreasing the field strength after full voltage has been applied to the motors. The shunt field windings are connected across the line when dynamic braking connections are established for the motors, thereby exciting the shunt fields and causing the machines to start generating a high current immediately without waiting for the series fields, which depend upon residual magnetism at the beginning of generation, to build up. In this manner, the dynamic braking action is produced quickly without the delay resulting from the time required for the series fields to gradually increase in strength.

For a fuller understanding of the nature and scope of my invention, reference may be had to the following detailed description, taken in conjunction with the accompanying drawing, in which:

Figure 1 is a diagrammatic view of a control system embodying my invention; and

Fig. 2 is a diagrammatic view of a portion of the system shown in Fig. 1.

Referring to the drawing, the system shown comprises electric motors 10 and 11, which may be utilized to propel an electric vehicle (not shown). The motor 10 is provided with an armature winding 12, a series field winding 13 and a shunt or separately-excited field winding 14. Likewise, the motor 11 is provided with an armature winding 15, a series field winding 16, and a shunt or separately-excited field winding 17.

A line switch 18 is provided for connecting the motors 10 and 11 to a power conductor 19 that is energized from a trolley conductor 20 which may be energized by any suitable source of power, such as a generating station (not shown).

In accordance with the usual practice, a plurality of resistors 21, 22 and 23 are provided for controlling the voltage applied to the motors 10 and 11. Accelerating switches 24, 25 and 26 are disposed to shunt the resistors 21, 22 and 23, respectively, to accelerate the motors in a manner well known in the art.

In order to simplify the drawing and the specification, switches 27 and 28 are shown for connecting the motors 10 and 11 in parallel circuit relation only. It will be understood that additional switches may be readily provided for first connecting the motors in series circuit relation and then in parallel circuit relation in a well known manner, if it is desired to utilize series-parallel control.

With a view to establishing dynamic braking connections for the motors 10 and 11 to stop the vehicle, a switch 29 is provided for cross-connecting the motors, as will be more fully described hereinafter. The switches 27 and 28 cooperate with the switch 29 to establish the dynamic braking connections.

In order that the shunt field windings 14 and 17 may be energized to increase the motor torque during acceleration and deenergized after the resistors 21, 22 and 23 have been shunted to apply full voltage to the motors to further increase the speed of the motors by decreasing their field strength, a switch 31 is provided for connecting the field windings 14 and 17 to the power conductor 19, thereby separately exciting the field windings 14 and 17 when the switch 31 is closed.

A manually-operable controller 32, which may be of the drum type, is provided for controlling the operation of the switch 31 and also the other switches described hereinbefore. The controller 32 is so constructed that the field windings 14 and 17 are energized when dynamic braking connections are established for the motors 10 and 11, thereby ensuring that the motors will start generating current immediately because of the excitation of the shunt field windings.

When the series field windings of the motors are depended upon for excitation, the braking action of the motors is slow in taking effect, as the only field strength available when the braking connections are first established is that resulting from the residual magnetism of the series fields. Therefore, only a small current is generated at first, which gradually increases as the series fields build up. By providing the motors with shunt field windings which are energized from the line during dynamic braking, as herein described, a relatively high current is generated immediately, thereby causing the dynamic braking action to take effect quickly. As the armature current builds up, the series field strength is increased, thereby increasing the total field strength of the motors.

In order that the functioning of the foregoing apparatus may be better understood, the operation of the system will now be described. Assuming that it is desired to connect the motors 10 and 11 to the power source to accelerate the motors, the controller 32 may be actuated to position "a", thereby closing the switches 18, 27 and 28 to connect the motors to the conductor 19.

The energizing circuit for the actuating coil of the switch 18 may be traced from conductor 19, through contact members 33 and 34, bridged by contact segment 35, conductor 36, the actuating coil of the switch 18 and conductor 37 to the grounded conductor 38. The energizing circuit for the actuating coil of the switch 27 extends from a contact member 41, that engages the now energized segment 35, through conductors 42 and 43, the coil of the switch 27 and conductor 37 to the grounded conductor 38. The conductor 42 is also connected to the actuating coil of the switch 28, thereby energizing that coil simultaneously with the coil of the switch 27.

Accordingly, the motors 10 and 11 are connected to the power source, the circuit for the motor 10 extending from the power conductor 19, through conductor 44, the line switch 18, the resistors 21, 22 and 23, conductor 45, the series field winding 13, the armature winding 10, and the contact members of switch 28 to the grounded conductor 38. The circuit for the motor 11 extends from the conductor 45, through the contact members of switch 27, conductor 46, the armature winding 15, the series field winding 16 and conductor 47 to the grounded conductor 38.

It will be observed that a circuit may be established for the actuating coil of the switch 31 by closing a knife switch 48. This may be done either before or after actuating the controller 32 to position "a", preferably before. When the switch 48 is closed, the actuating coil of the switch 31 is energized through a circuit extending from a contact member 49, conductor 51, the switch 48, conductor 52, the coil of the switch 31, and conductor 53 to the grounded conductor 38.

The closing of the switch 31 connects the field windings 14 and 17 of the motors 10 and 11 to the power source, thereby energizing the shunt fields of the motors, which increases the field strength and consequently increases the motor torque available for accelerating the vehicle. The circuit through the shunt field windings may be traced from the power conductor 19, through conductor 54, the contact members of switch 31, conductor 55, the field winding 14, conductor 56, the field winding 17, and conductor 57 to the grounded conductor 38.

The motors may be accelerated in the usual manner by actuating the controller 32 through positions "b", "c" and "d", thereby closing the switches 24, 25 and 26 to shunt the resistors 21, 22 and 23 in sequential relation. As the controller 32 is actuated through positions "b", "c" and "d", contact members 58, 59 and 61 engage the segment 35 to energize the conductors 62, 63 and 64, respectively, thereby energizing the actuating coils of the switches 24, 25 and 26 to close these switches in sequential relation.

If it is desired to further increase the speed of the motors 10 and 11, the controller 32 may be actuated to position "e", which deenergizes the actuating coil of the switch 31 and disconnects the field windings 14 and 17 from the power source. In this manner, the field strength of the motors may be decreased, thereby increasing the speed at which the motors will operate and consequently increasing the maximum speed of the vehicle.

In the event that it is desired to retard the movement of the vehicle by dynamic braking, the controller 32 may be actuated to the "Brk" position, thereby permitting the line switch 18 to open to disconnect the motors from the power source and closing the switch 29 to establish dynamic braking connections for the motors. The actuating coil of the switch 29 is energized through a circuit which extends from a contact member 65, which engages a segment 66, through conductor 67, the coil of the switch 29 and conductor 37 to the grounded conductor 38.

It will be observed that the switch 31 remains closed when the controller 32 is actuated to the "Brk" position, thereby maintaining the shunt field windings energized, also that the switches 27 and 28 are reclosed simultaneously with the closing of the switch 29, the conductor 42 being energized by a contact segment 68.

When the switches 27, 28 and 29 are closed, the motors 10 and 11 are so connected that the series field winding 13 of the motor 10 is in series circuit relation with the armature winding 15 of the motor 11 and the series field winding 16 of the motor 11 is in series circuit relation with the armature winding 12 of the motor 10. In this manner, the direction of flow of current in the armature winding of each motor is reversed, but the direction of flow of current in the field windings is not changed. Therefore, the motors are caused to act as generators, driven by the momentum of the vehicle, and dynamic braking is established. Referring to Fig. 2, the motor circuits may be traced from one terminal of the armature winding 12 of the motor 10 through the contact members of switch 29, conductor 69, the series field winding 16 of the motor 11, conductors 47 and 38, and the contact members of switch 28 to the other terminal of the armature winding 12. The circuit through the motor 11 may be traced from one terminal of its armature winding 15, through conductor 46, the contact members of switch 27, conductor 45, the series field winding 13, the contact members of switch 29 and the conductor 69 to the other terminal of the armature winding 15.

As explained hereinbefore, the shunt field windings 14 and 17 are energized when the dynamic braking connections are established in order that dynamic braking will be effected without the delay resulting from the time required for the series field strength to build up. Inasmuch as the shunt fields are energized from the power source, dynamic braking will be produced independently of the magnetic effect of the series fields and will take effect immediately upon the establishment of the dynamic braking connections.

I do not desire to be restricted to the particular form or arrangement of parts herein shown and described, since it is evident that they may be changed and modified without departing from the spirit and scope of my invention as defined in the appended claims.

I claim as my invention:

1. In a motor control system, in combination, a plurality of motors, a source of power for the motors, each motor having an armature winding, a series field winding and a shunt field winding, means for increasing the voltage applied to the armature windings to accelerate the motors, means for energizing the shunt field windings during part of the accelerating period, means for cross-connecting the motors whereby the armature winding of one motor is connected in series circuit relation with the field winding of another motor to cause the motors to act as generators for dynamic braking, and means for separately exciting the shunt field windings from the power source to cause the dynamic braking action to take effect quickly.

2. In a motor control system, in combination, a pair of motors, a source of power for the motors, each motor having an armature winding, a series field winding and a shunt field winding, switching means for connecting the armature windings and the series field windings of the motors to the power source to accelerate the motors, means for separately exciting the shunt field windings during part of the accelerating period, switching means for cross-connecting the motors whereby the armature winding of one motor energizes the series field winding of the other motor to produce dynamic braking, and switching means for connecting the shunt field windings of the motors to the power source during dynamic braking to produce a quick dynamic braking action.

3. In a motor control system, in combination, a pair of motors, a source of power for the motors, each motor having an armature winding, a series field winding and a shunt field winding, switching means for connecting the motors to the power source to accelerate the motors, switching means for cross-connecting the motors whereby the armature winding of one motor energizes the series field winding of the other motor to produce dynamic braking, switching means for connecting the shunt field windings of the motors to the power source during dynamic braking to produce a quick dynamic braking action, and a controller for controlling the operation of said switching means.

4. In a motor control system, in combination, a plurality of motors, a source of power for the motors, each motor having an armature winding, a series field winding and a shunt field winding, means for connecting the motors to the power source, means for increasing the voltage applied to the motors to accelerate the motors, means for energizing the shunt field windings during acceleration to increase the accelerating torque of the motors and for deenergizing the shunt field windings after full voltage is applied to the motors to increase the motor speed, means for establishing dynamic braking connections for the motors, and means for energizing the shunt field windings during dynamic braking to produce a quick braking effect.

5. In a motor control system, in combination, a plurality of motors, a source of power for the motors, each motor having an armature winding, a series field winding and a shunt field winding, switching means for connecting the motors to the power source, a plurality of resistors for controlling the voltage applied to the motors, switching means for shunting the resistors to accelerate the motors, switching means for connecting the shunt field windings to the power source during acceleration and for disconnecting them from the power source after the said resistors are shunted, switching means for establishing dynamic braking connections for the motors, and control means for controlling the operation of said switching means to cause the shunt field windings to be connected to the power source during dynamic braking to produce a quick braking effect.

6. In a motor control system, in combination, a plurality of motors, a source of power for the motors, each motor having an armature winding, a series field winding and a shunt field winding, means for connecting the motors to the power source, means for increasing the voltage applied to the armature windings to accelerate the motors, means for applying voltage to the shunt field windings during acceleration to increase the accelerating torque of the motors, means for decreasing the voltage applied to the shunt field windings after full voltage is applied to the armature windings to increase the motor speed, means for establishing electrical braking connections for the motors, and means for energizing the shunt field windings during electrical braking.

FREDERICK W. McCLOSKEY.